(12) United States Patent
Saitoh et al.

(10) Patent No.: US 7,353,366 B2
(45) Date of Patent: Apr. 1, 2008

(54) PROCESSING DEVICE

(75) Inventors: Hiroyuki Saitoh, Kawasaki (JP);
Takeshi Nishidoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 11/277,622

(22) Filed: Mar. 28, 2006

(65) Prior Publication Data
US 2007/0174591 A1    Jul. 26, 2007

(30) Foreign Application Priority Data
Dec. 7, 2005  (JP)  .............................. 2005-352895

(51) Int. Cl.
*G06F 9/00* (2006.01)
(52) U.S. Cl. ..................................................... 712/220
(58) Field of Classification Search ................ 712/220, 712/40; 718/105
See application file for complete search history.

(56) References Cited

U.S. PATENT DOCUMENTS 6,202,149 B1*  3/2001  Hedegard .................... 713/100
6,754,215 B1*  6/2004  Arikawa et al. ........... 370/395.4
6,788,648 B1*  9/2004  Peterson ..................... 370/252
6,948,088 B1*  9/2005  Sharan ............................ 714/6
6,982,956 B2*  1/2006  Blanc et al. ................. 370/235

FOREIGN PATENT DOCUMENTS

JP    60-55464    3/1985

* cited by examiner

*Primary Examiner*—Eric Coleman
(74) *Attorney, Agent, or Firm*—Staas & Halsey LLP

(57) ABSTRACT

A transaction input/output CPU receives a transaction to be processed and outputs the execution result of the transaction. A plurality of processing CPUs execute the transaction according to an instruction from the transaction input/output CPU. A plurality of memory areas are related to each processing CPU and store a transaction which are inputted to the transaction input/output CPU and its execution result. A register stores a pointer for indicating an address common to the plurality of memory areas. The processing CPU reads a pointer from the register, and reads a transaction from the storage destination in memory corresponding to each processing CPU and executes it.

14 Claims, 18 Drawing Sheets

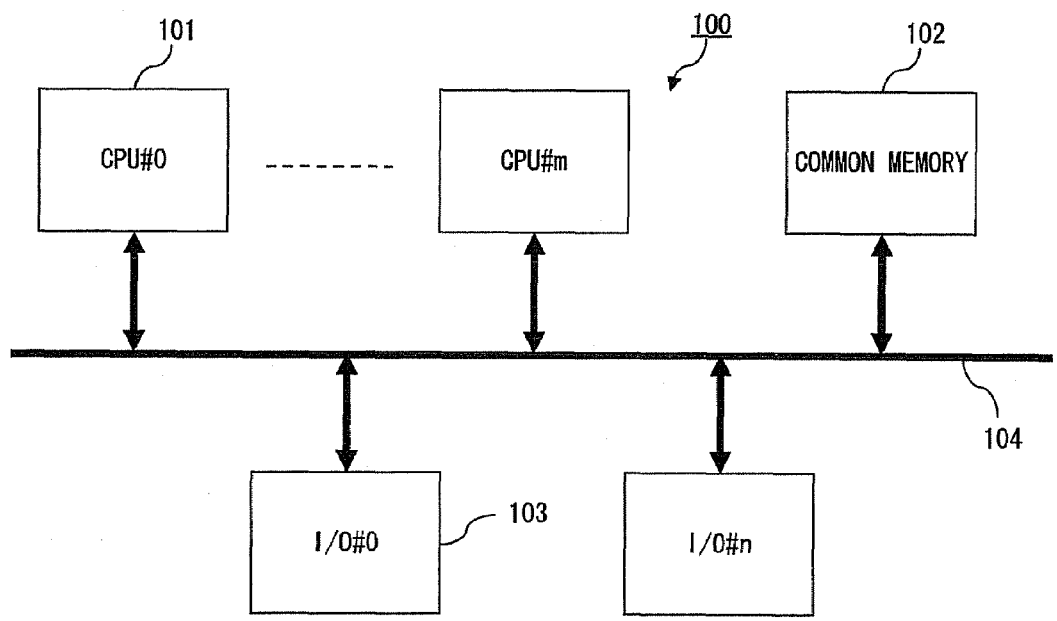
F I G. 1

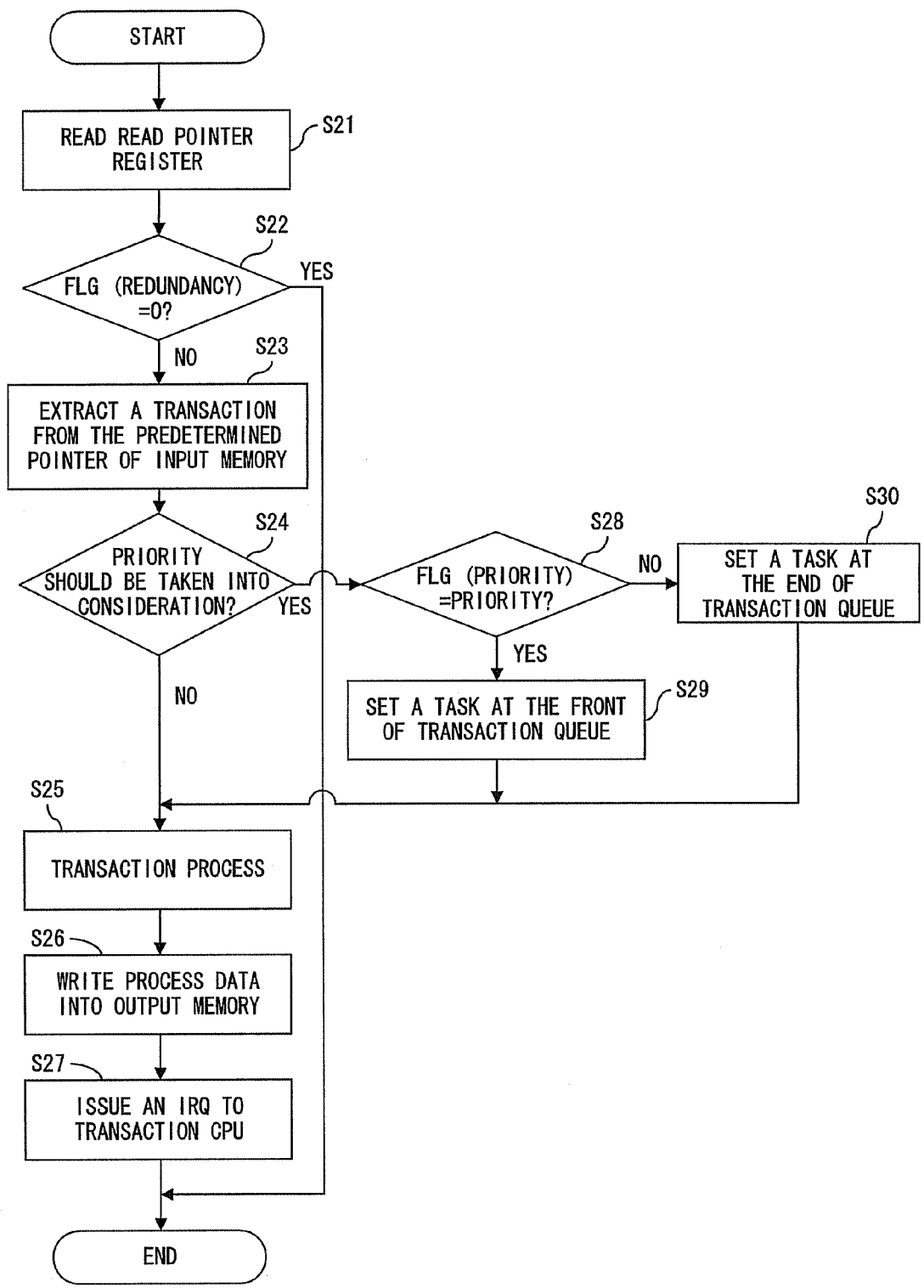
F I G. 4

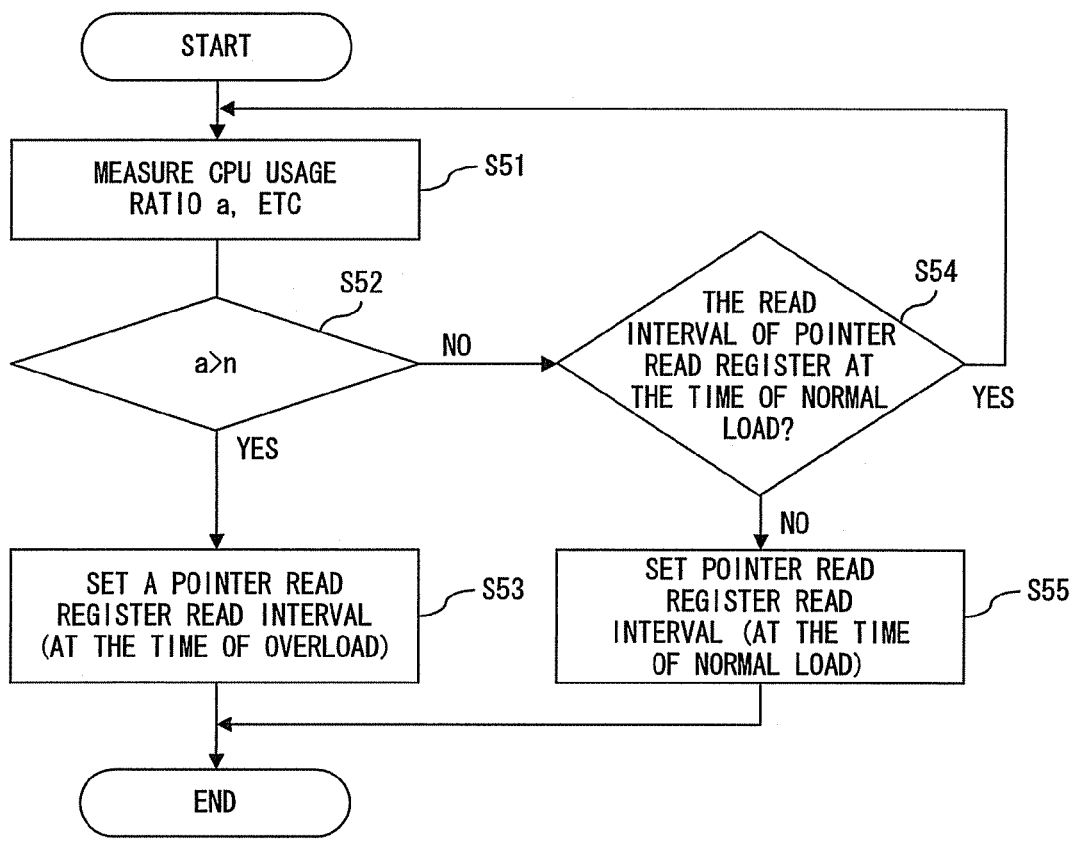
F I G. 6

| FLG | POINTER VALUE |
|---|---|

FIG. 8A

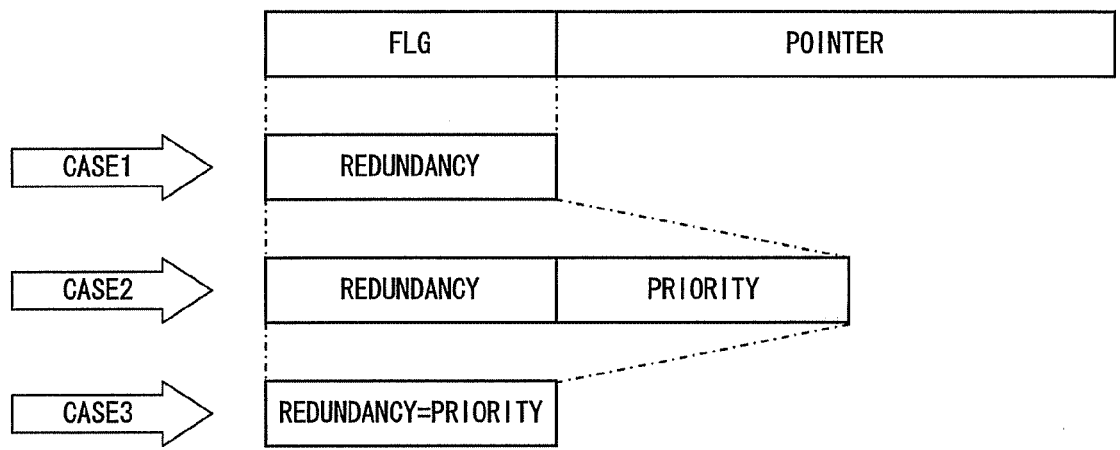
F I G. 8 B

| |
|---|
| PRIORITY CONSIDERED/UNCONSIDERED INFORMATION |
| REDUNDANCY/PRIORITY BOTH USABLE INFORMATION |
| READ INTERVAL INITIAL VALUE |
| READ INTERVAL LOAD RATIO THRESHOLD AND READ INTERVAL |
| FIFO DEPTH THRESHOLD FOR SETTING REDUNDANCY AND REDUNDANCY |
| PARALLEL PROCESS DISCARD FIFO LENGTH THRESHOLD |
| PARALLEL PROCESS DISCARD LOAD RATIO THRESHOLD |
| PARALLEL PROCESS DISCARD FLG REDUNDANCY DIFFERENTIAL VALUE |
| LOAD RATIO THRESHOLD FOR SETTING REDUNDANCY |
| LIGHT LOAD PROCESSING CPU'S READ INTERVAL MODIFICATION TRANSACTION INPUT VOLUME THRESHOLD |
| ... |

FIG. 10

PROCESSING DEVICE

BACKGROUND OF THE INVENTION

1. Field of the Invention

The present invention relates to a technology for executing a process redundantly by a plurality of CPUs.

2. Description of the Related Art

Thanks to the recent proliferation of an information technology (IT) into our society, a variety of information systems utilizing the IT is provided to our society. Information/communication equipment for realizing these systems is becoming a necessary and indispensable lifeline of social infrastructure in our modern society and an enormous amount of information processing must always be executed without stoppage. In order to meet such a requirement, information/communication equipment constituting an information system must process an enormous amount of information rapidly and without delay. Therefore, in order to meet such a requirement, in a system for processing a large amount of information rapidly and securely, such as a communication system or the like, devices in which a plurality of CPUs is provided and a hardware configuration for executing load distribution control is adopted are used.

FIG. 1 shows a conventional processing circuit. The processing circuit 100 comprises a plurality of CPUs 101 (Nos. 0 through m in FIG. 1), common memory 102 for performing a synchronous process among the CPUs, a plurality of I/O units 103 (Nos. 0 through n in FIG. 1) for externally inputting/outputting data, which are connected to each other by a common bus. The processing circuit with the configuration shown in FIG. 1 adopts a method in which an interrupt request from the I/O unit 103 is inputted to the plurality of CPUs 101 in parallel in order to distribute load and a CPU 101 that first fetches the interrupt request executes it, or a method for transferring a transaction to each CPU 101 and executing it. Also, for the hardware configuration for exercising load distribution control, a full running configuration in which all processing circuits are used as running or an N+1 configuration being a redundant configuration is used.

Also, a multiple computer system is provided with a technology for modifying a redundancy system according to the number of CPUs or the degree of importance of data (for example, Patent reference 1).

Patent reference 1: Japanese Patent Application Publication No. S60-55464

In the conventional processing circuit, a plurality of CPUs is connected in parallel by a common bus, when the common bus interface hardware fails, the system cannot operate. When load increases and the frequency of the access to the common bus of a CPU increases, the functionality is hindered due to the bottle-neck of the bus. Furthermore, when a CPU fails, there is no way to relieve a transaction being processed in the failed CPU.

SUMMARY OF THE INVENTION

It is an object of the present invention to provide a technology capable of further improving the transaction execution speed and failure resistance of a CPU.

In order to attain the objective, the present invention comprises a transaction input/output CPU for receiving a transaction to be executed and outputting its execution result, a plurality of processing CPUs for executing the transaction according to an instruction from the transaction input/output CPU, a plurality of transaction storage units provided in relation to each processing CPU, for storing the transaction inputted to the transaction input/output CPU and its execution result and a destination storage unit for storing storage destination information indicating a storage destination common to the plurality of storage units. The processing CPU reads the storage destination information from the destination storage unit, and reads the transaction from the storage destination of the transaction stored in the transaction storage unit related to each processing CPU and executes it.

A transaction input/output CPU for receiving/outputting a transaction from/to a processing circuit is provided separately from a plurality of processing CPUs for executing a transaction. Each of the plurality of processing CPUs reads a transaction from the transaction storage unit corresponding to it, according to storage destination information. Even when a large amount of transactions to be executed are inputted to/outputted from a processing circuit, the influence of the transactions on their execution speed can be suppressed to a low level since each processing unit reads the transaction from the storage unit corresponding to it own and executes. Since the transaction is executed by a plurality of processing CPUs, even when a specific processing CPU fails while executing a transaction, the other processing CPUs also execute the transaction. Therefore, a failure resistance can be improved.

Furthermore, the destination storage unit can also store weighting information about redundancy in executing an inputted transaction by a plurality of processing CPUs in parallel or the priority of the transaction, and the transaction input/output CPU can also set the weighting information, based on the load status of the processing circuit or priority included in the inputted transaction and store it in the destination storage unit.

Furthermore, if it is determined that the load of the plurality of CPUs exceeds a predetermined value when a transaction is redundantly executed by two or more processing CPUs, the transaction input/output CPU can also discard the transaction in one or more processing CPUs. The transaction input/output CPU can also reset the redundancy to a lower value, or gradually increases or decreases the redundancy of a transaction redundantly executed by a plurality of processing CPUs depending on the load of the processing CPUs.

According to the present invention, the execution speed and failure resistance of a transaction can be improved by a simple circuit configuration.

BRIEF DESCRIPTION OF THE DRAWINGS

FIG. 1 shows the configuration of the conventional processing circuit.

FIG. 4 is a flowchart showing the basic operation of transaction execution in the processing CPU.

FIG. 6 is a flowchart showing the process of setting a read interval according to a load applied to the processing CPU.

FIG. 8A shows the structure of data stored in a pointer read resister.

FIG. 8B shows the flag configuration.

FIG. 10 shows an example of setting data to be referenced.

DESCRIPTION OF THE PREFERRED EMBODIMENTS

The preferred embodiments of the present invention are described in detail with reference to the drawings.

Figure 2:
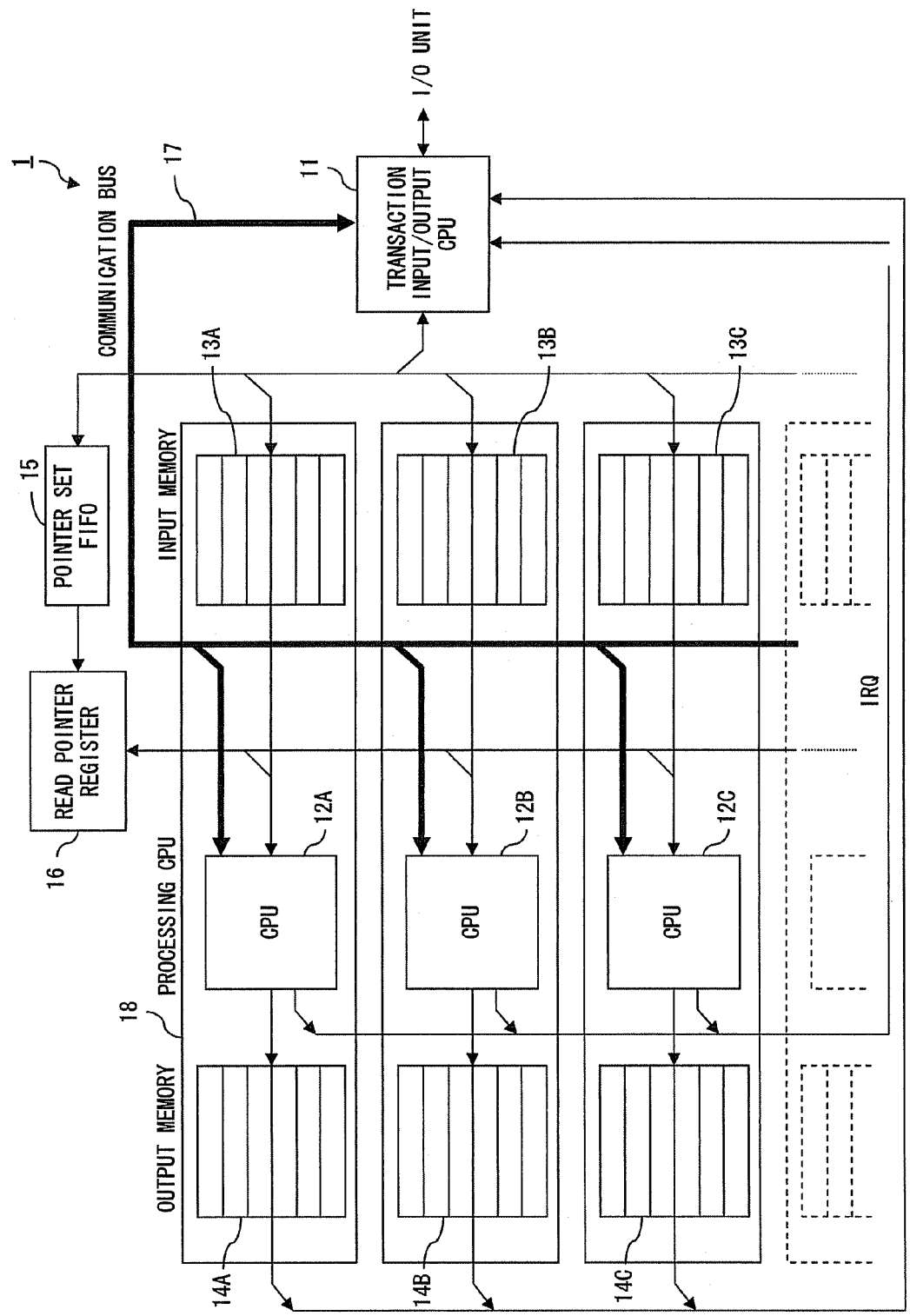
FIG. 2 shows the configuration of the processing circuit of the present invention.

FIG. 2 shows the configuration of the processing circuit of the present invention. The processing circuit 1 shown in FIG. 2 comprises a transaction input/output CPU 11, a plurality of processing CPUs 12 (12A, 12B and 12C), a plurality of areas of input memory 13 (13A, 13B and 13C), a plurality of areas of output memory 14 (14A, 14B and 14C), a pointer set First-In First-Out (FIFO) 15, a read pointer register 16, a communication bus 17 and a bus 18.

The transaction input/output CPU (hereinafter called a transaction CPU) 11 receives a transaction from outside the processing circuit 1 and outputs the transaction result to an external entity. The input memory 13 stores a transaction inputted to the processing circuit 1. The processing CPU 12 reads the transaction inputted to the processing circuit 1 from the input memory 13 and executes it. The output memory 14 stores the process result of the transaction by the processing CPU 12. The read pointer register 16 stores information needed for each processing CPU 12 to read a transaction from the input memory 13 and execute it, such as an address being the storage destination of a transaction in the input memory 13 and the like. The pointer set FIFO 15 manages the number of information stored in the read pointer register 16, specifically the number of transactions (number of queues) byway of FIFO(first-in, first-out). The communication bus 17 is used for communication between the transaction CPU 11 and each processing CPU 12. The bus 18 is used when each processing CPU 12 executes a transaction and outputs its execution result.

Although in FIG. 2, three sets of the processing CPU 12, input memory 13 and output memory 14 are illustrated, the number of sets is not limited to this number. If two or more sets of the processing CPU 12, input memory 13 and output memory 14 are provided, a transaction can be executed by a processing CPU provided with a redundant configuration as described below.

In the processing circuit 1 of the preferred embodiment, a plurality of processing CPUs 12 is disposed in parallel, and the input memory 13 and output memory 14 are related and provided to one processing CPU 12 one to one. A transaction detected by the transaction CPU 11 is synchronized with and written into an address common to all areas of the input memory 13 and information including the address is stored in the read pointer register 16. The processing CPU 12 reads the information, such as an address common to the processing CPUs 12 and the like, from the read pointer register 16 and extracts a transaction stored in the input memory 13, using read information. The transaction is executed by the plurality of processing CPUs 12 in parallel. The processing CPU 12 stores the execution result in output memory 14 corresponding to it. The transaction result stored in the output memory 14 is outputted from the transaction CPU 11 via an I/O unit.

The process of storing a transaction in the input memory 13 of the processing circuit 1, process of storing information including its address in the read pointer register 16 via the pointer set FIFO 15, process of the processing CPU 12 reading a transaction based on the information and executing it, process of storing the execution result in the output memory 14, process of the processing CPU 12 interrupting and notifying the transaction CPU 11 of the completion of the transaction and the process of reading the execution result from the output memory 14 and transferring it to the transaction CPU 11 are all performed via the bus 18 which is different from the communication bus 17.

The information for executing a transaction includes a flag for determining whether a pointer value is valid or invalid in addition to a pointer indicting a common address. The information is weighted by the flag and the flag stores information, such as the redundancy of the processing CPU 12 with a multi-process configuration, the priority of a transaction and the like.

In the following description, a transaction means, for example, a series of processes performed by the infrastructure side device in a radio communication network. For the infrastructure side device, a base station control device is used as an example. As an example of a series of transactions executed in the base station control device, the base station control device receives a request from a terminal that wants to start communication with a partner terminal via the device, negotiates with the base station control device on the partner terminal side and executes a series of transactions in order to establish a communication path. The transaction is not limited to a radio communication process and includes a general transaction. However, the processing circuit 1 provided for the base station control device in communication is described below, and a "device" means the base station control device below.

The basic operation of the processing circuit 1 of this preferred embodiment is described below with reference to FIGS. 3A through 9.

Figure 3A:
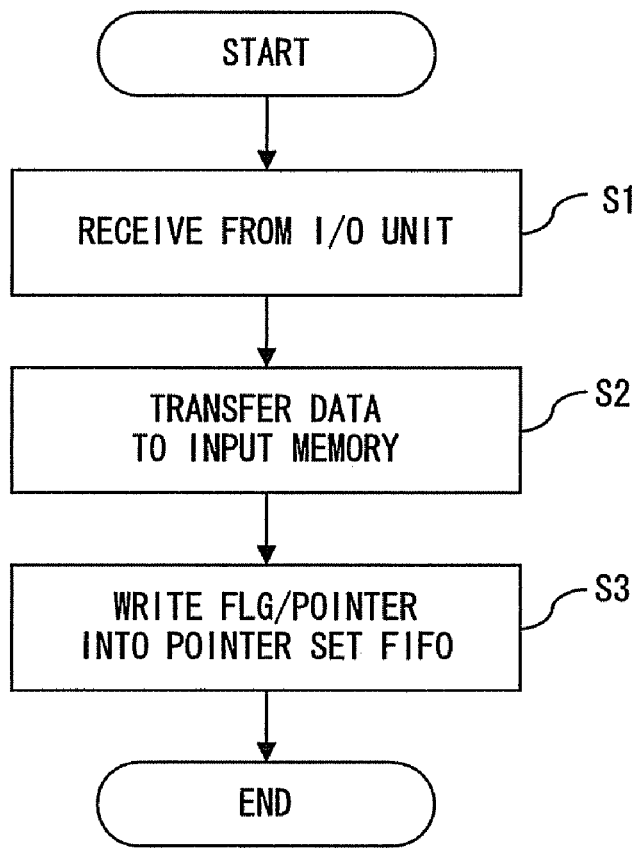
FIG. 3A is a flowchart showing the transaction input process in a transaction input/output CPU.
Figure 3B:
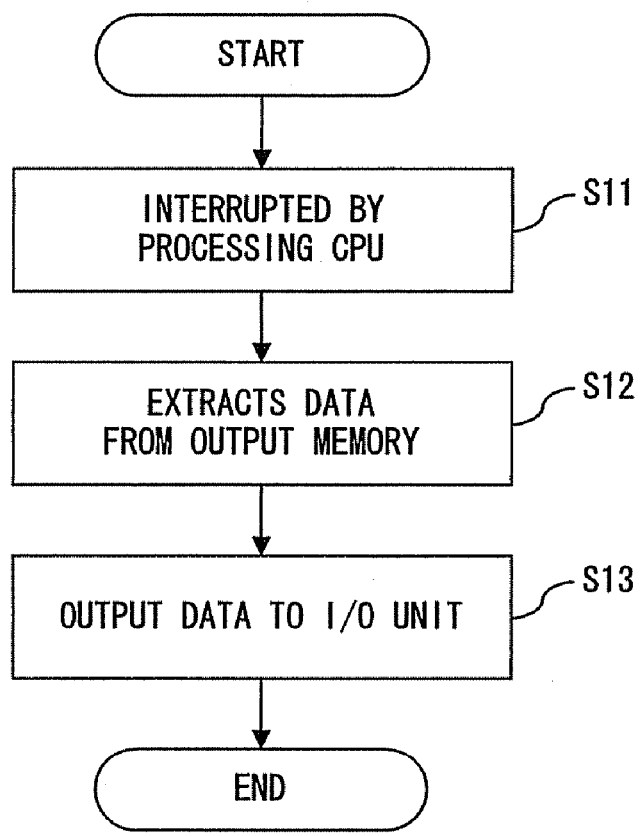
FIG. 3B is a flowchart showing the transaction output process in a transaction input/output CPU.

FIGS. 3A and 3B are flowcharts showing the transaction input/output process in the transaction CPU 11. FIG. 3A is a flowchart for the case where a transaction is externally inputted. Firstly, when in step S1 a specific transaction is inputted from an I/O unit, in step S2 its transaction data is transferred to the input memory 13. In step S3, information, such as the storage destination of the transaction in the input memory 13 is written into the pointer set FIFO 15 and the process is terminated. After the completion of the process shown in FIG. 3A, the processing CPU 12 executes the transaction, and interrupts and notifies the transaction CPU 11 of the execution result.

FIG. 3B is a flowchart in the case where the process result of a transaction is externally outputted. Firstly, in step S11 an interrupt request is received from the processing CPU 12, and in step S12 its process result data is extracted from output memory 14 corresponding to the processing CPU 12. In step S13, the extracted data is outputted to the I/O unit and the process is terminated.

FIG. 4 is a flowchart showing the basic operation of transaction execution in the processing CPU 12. If in this preferred embodiment, for example, "3" is set, it means that a transaction is to be executed by three processing CPUs 12.

Firstly, in step S21 data is read from the read pointer register 16, and in step S22 it is determined whether a flag value indicating the redundancy of the processing CPU 12 of the read data is "0". If "0" is set in the flag indicating the redundancy, the process is terminated without performing any special process. If a value other than "0" is set in the flag, the flow proceeds to step S23 to extract a transaction to be executed from the prescribed pointer of the input memory 13. In step S24, when processing the transaction, it is determined whether it should be processed taking into consideration the priority of the transaction. If there is no need to take into consideration the priority of the transaction, the flow proceeds to step S25 to execute the transaction. In step S26, the process result is written into the output memory 14. Lastly, in step S27, an interrupt request (IRQ) is issued to the transaction CPU 11 and the process is terminated.

If in step S24 it is determined that the priority must be taken into consideration, the flow proceeds to step S28 to determine whether the flag value indicating the priority of a transaction stores its "priority". If it is determined that there is a transaction to which priority process should be applied, in step S29 the task of the transaction is placed at the front of its transaction queue and the flow returns to step S25 to execute the transaction. In step S25 and subsequent steps, the same processes as described above are performed. By setting a task at the top of the transaction queue, the transaction is executed earlier than another transaction whose processing is already started. By executing a priority transaction early, highly urgent transactions, such as a VIP call, connections to "110" and "119" and the like, are ensured.

If in step S28 the flag stores a value indicating transactions other than "priority", specifically, "ordinary" or "low priority" the flow proceeds to step S30. In step S30, the task of the transaction is set at the end of the transaction queue and the flow returns to step S25 as in the case of a priority transaction to execute the transaction, the processes in steps S26 and S27 are performed, and the process is terminated.

As shown in FIG. 4, when reading a pointer from the read pointer register 16, each processing CPU 12 refers to the redundancy flag and executes the transaction if the flag value is not "0". A method for a plurality of processing CPUs 12 executing a transaction based on a flag indicating redundancy is described below with reference to FIG. 5.

Figure 5:
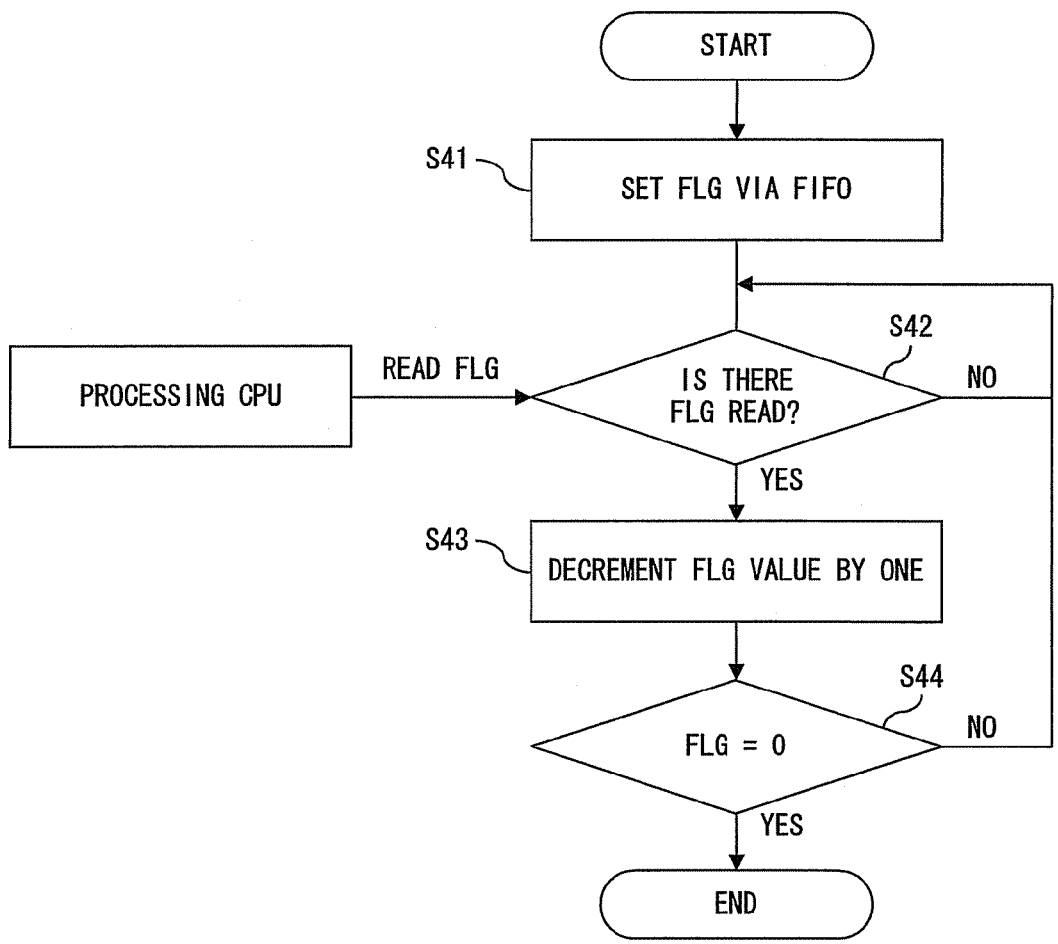
FIG. 5 is a flowchart showing the flag value setting process by transaction execution.

FIG. 5 is a flowchart showing the flag value setting process of transaction execution. A series of processes shown in FIG. 5 is started when the transaction CPU 11 receives a specific transaction via an I/O unit and is executed by the transaction CPU 11.

In step S41 a value is set in the flag via the pointer set FIFO 15, and in step S42 the transaction waits until the flag of the read pointer register 16 is read from the processing CPU 12. When the read of the processing CPU 12 is recognized, the flow proceeds to step S43 to decrement the flag value by one. In step S44 it is determined whether the flag value is zero. If a value which is 1 or more is stored in the flag, it is determined that processing CPUs 12 other than the processing CPU that read the flag in the previous step needs to execute the transaction and the flow returns to step S42. When the flag value becomes "0", the process is terminated. After the flag value is set to "0", the pointer value of the corresponding transaction becomes invalid and the transaction is discarded from the input memory 13.

The flag of the read pointer register 16 indicates the number of processing CPUs for executing the transaction. Each of the number of processing CPUs that is indicated by the flag reads necessary information from the read pointer register 16, reads a corresponding transaction from the input memory 13, and executes it. Every time each processing CPU 12 reads a transaction from the input memory 13, the process shown in FIG. 5 is executed and the process shown in FIG. 4 is executed until the flag becomes "0". Since a plurality of processing CPUs 12 execute a specific transaction, for example, even when a specific processing CPU 12 fails to execute the transaction, the other processing CPUs 12 can execute it, thereby improving the failure resistance of the processing circuit 1.

If three or more processing CPUs 12 execute a transaction, for example, their execution results can also be compared with each other and a result transferred to the transaction CPU 11 can be selected by majority. Thus, the processing reliability can be further improved.

For example, the flag value can also be defined in advance by a program. Alternatively, the station data of a device with the processing circuit 1 can set it. Furthermore, a program or station data can also set it to an appropriate value, according to an environment in which a transaction to be processed or the like is executed.

The processing circuit 1 of this preferred embodiment can execute a transaction, according to the amount of load applied to the processing CPU or the like, since the flag includes information, such as the redundancy of a processing CPU 12, the priority of a transaction and the like. For example, the time interval at which the processing CPU 12 regularly reads the read pointer register 16 (of the step S21 in FIG. 4) can be changed according to a load applied to the processing CPU 12. Hereinafter the time interval at which the processing CPU 12 reads the read pointer register 16 is called a read interval.

FIG. 6 is a flowchart showing the process of setting a read interval according to a load applied to the processing CPU 12. Each processing CPU 12 regularly executes the process shown in FIG. 6.

In step S51, a value for determining the load status of the processing CPU 12 is calculated. In this case, the value for determining the load status indicates the depth of a FIFO (queue length) of the pointer set FIFO 15, the number of pointers read per unit time (the amount of redundancy change and the number of transactions in process) or the like, in addition to the load ratio, such as a usage ratio etc. shown in the flowchart of FIG. 6. In the following description, this value measured in step S51 is described as a measurement value a.

In step S52, it is determined whether the measurement value a exceeds a threshold n. If the measurement value a exceeds the threshold n, the flow proceeds to step S53 to set a value prepared in advance as a read interval at the time of overload as the read interval of the read pointer register 16. When determining it by measuring a CPU usage ratio, a threshold value n=50% and a read interval of 20 [ms] are set at the time of overload for example. If the measurement value a is equal to or less than the threshold n, the flow proceeds to step S54.

In step S54, it is determined whether a value at the time of overload is set as the set read interval of the read pointer register 16. If a value at the time of normal load is not set as a read interval, the flow proceeds to step S55. In step S55, the value at the time of normal load is set and the process is terminated. The read interval at the time of normal load is, for example, 10 [ms]. In step S55, it is determined that when although a load applied to the processing CPU 12 is fairly light, a read interval value is as at the time of overload, it is reset to a value at the time of normal load. If in step S54 it is determined that a value at the time of normal load is set as a read interval, the flow returns to step S51. After that, while the measurement value a (CPU usage ratio a in FIG. 6) or the like is equal to or less than the threshold n, the measurement of the value and its comparison with the threshold n are repeated.

The threshold n and read interval to be set can also be preset by a program or station data. Alternatively, they can be modified according to an instruction from the transaction CPU 11.

By the process shown in FIG. 6, the read interval is set to a long interval if the CPU usage ratio a is high and is set to a short interval if it is low. By setting an interval at which the read pointer register 16 is read, according to the load status of the processing CPU, the load of each processing CPU 12 can be controlled so as to become uniform.

Figure 7:
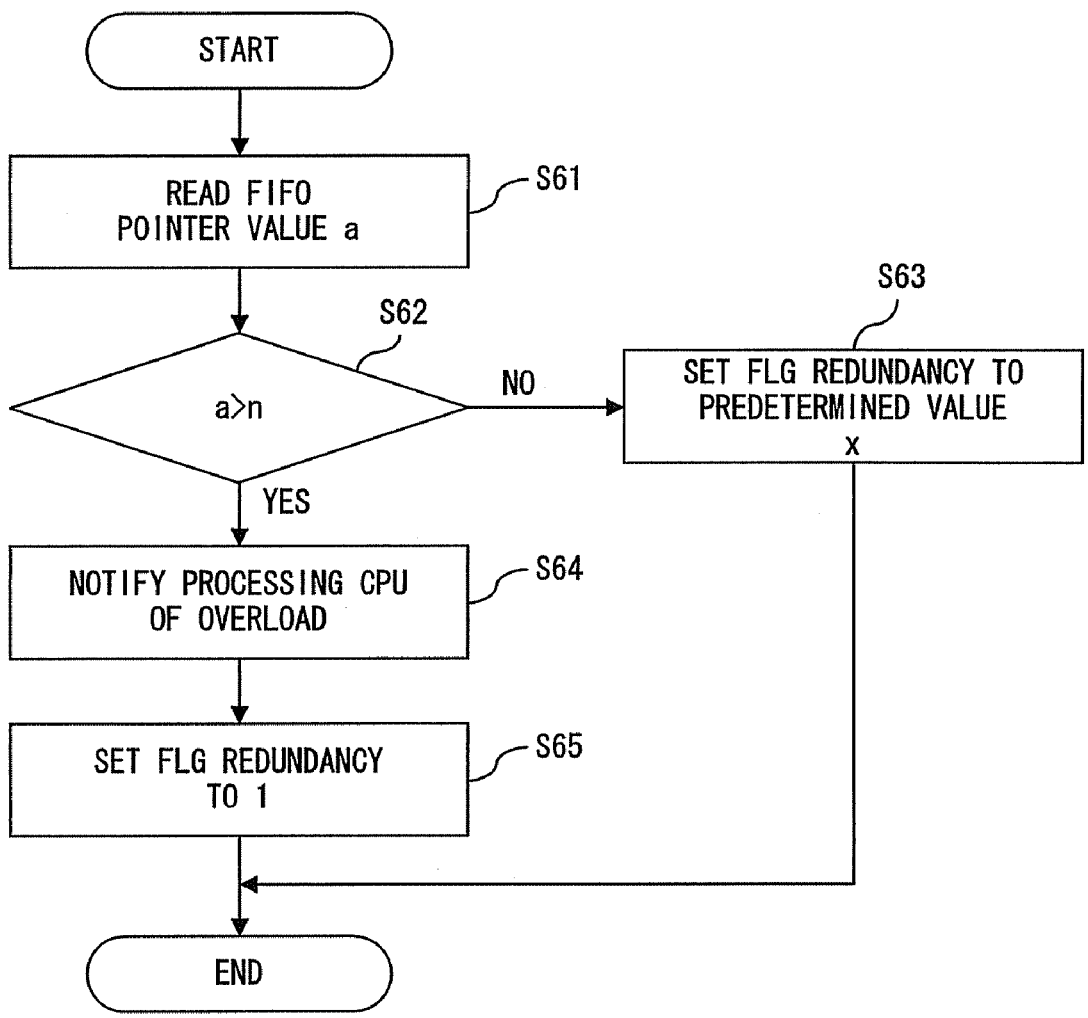
FIG. 7 is a flowchart showing the process of setting process redundancy according to the load status of the processing CPU.

FIG. 7 is a flowchart showing the process of setting process redundancy according to the load status of the processing CPU. The process shown in FIG. 7 can be realized by the transaction CPU 11 regularly monitoring a load applied to the processing CPU 12 by a transaction process, using the value a measured by the processing CPU 12 in the step S51 of FIG. 6.

Firstly, in step S61, the measurement value a is read and in step S62 it is determined whether the measurement value a exceeds the threshold n. If the measurement value a is equal to or less than the threshold n, the flow proceeds to step S63. In step S63, a predetermined value x is set as redundancy and the process is terminated. In this case, as already described, the predetermined value x is set by a program or station data.

If in step S63 the measurement value a exceeds the threshold n, the flow proceeds to step S64 to notify the processing CPU 12 that the processing CPU 12 is overloaded. In step S65, flag redundancy is set to 1 and the process is terminated.

By executing the process shown in FIG. 7, appropriate redundancy is set according to the load status of the processing CPU 12, based on the value a of each processing CPU 12 measured by the transaction CPU 11. By setting redundancy according to a load status, if the load is heavy, the configuration of the processing CPU 12 executing a transaction is modified from a multi-process configuration to a single process configuration. Thus, if the load is light, transaction reliability is improved by the multi-process configuration. If the load is heavy, the configuration is modified to a single process configuration to reduce the load of the processing CPU 12.

Figure 8A:
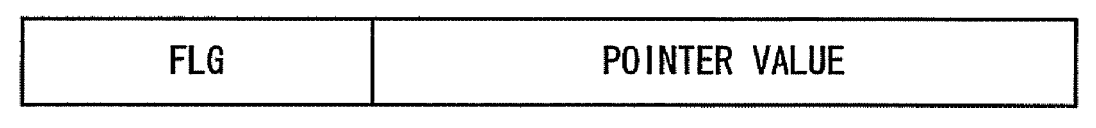

FIGS. 8A and 8B show the structure of data stored in the read pointer resister 16. As shown in FIG. 8A, the read pointer register 16 for one transaction comprises a flag and a pointer value. FIG. 8B shows the flag configuration. The contents of the flag is determined according to an environment in which a transaction is executed or the like. For example, when executing a transaction "case 1" shown in FIG. 8B, the content includes information about redundancy, specifically the redundant configuration of the processing CPU 12.

When executing a transaction "case 2", it includes information about redundancy and transaction priority. When executing a transaction "case 3", it includes information about priority and redundancy set according to the priority.

When the flag assumes a configuration "case 1", the number of processing CPUs executing a transaction is determined by a flag. Every time one processing CPU 12 starts executing a transaction the number continues to be decremented by the process shown in FIG. 5 until the flag value becomes zero one by one.

When the flag assumes the configuration "case 2", redundancy and priority are separately set by the flag. By reading a necessary value when executing a transaction, a transaction process is executed according to the redundant configuration and priority of the processing CPU 12.

When the flag assumes a configuration "case 3", a flag indicating the redundancy of the processing CPU 12 and the priority of the transaction in the processing circuit 1 are determined, according to the priority preset in the transaction. If a transaction with high priority is inputted, a large value is set for the flag accordingly and the transaction process is further replicated.

As transactions with high priority, there are, for example, a VIP call and "110" and "119" calls, that is, connections to the police station and fire station. Alternatively, priority can be set according to the installation location of the device.

Which of the three cases a transaction is executed in can also be defined in advance by a program or station data and the transaction can be executed in a fixed manner. Alternatively, which of the three cases a transaction is executed in can be selected, for example, at predetermined timing, such as the initialization of the device provided with the processing circuit 1 of this preferred embodiment.

Figure 9:
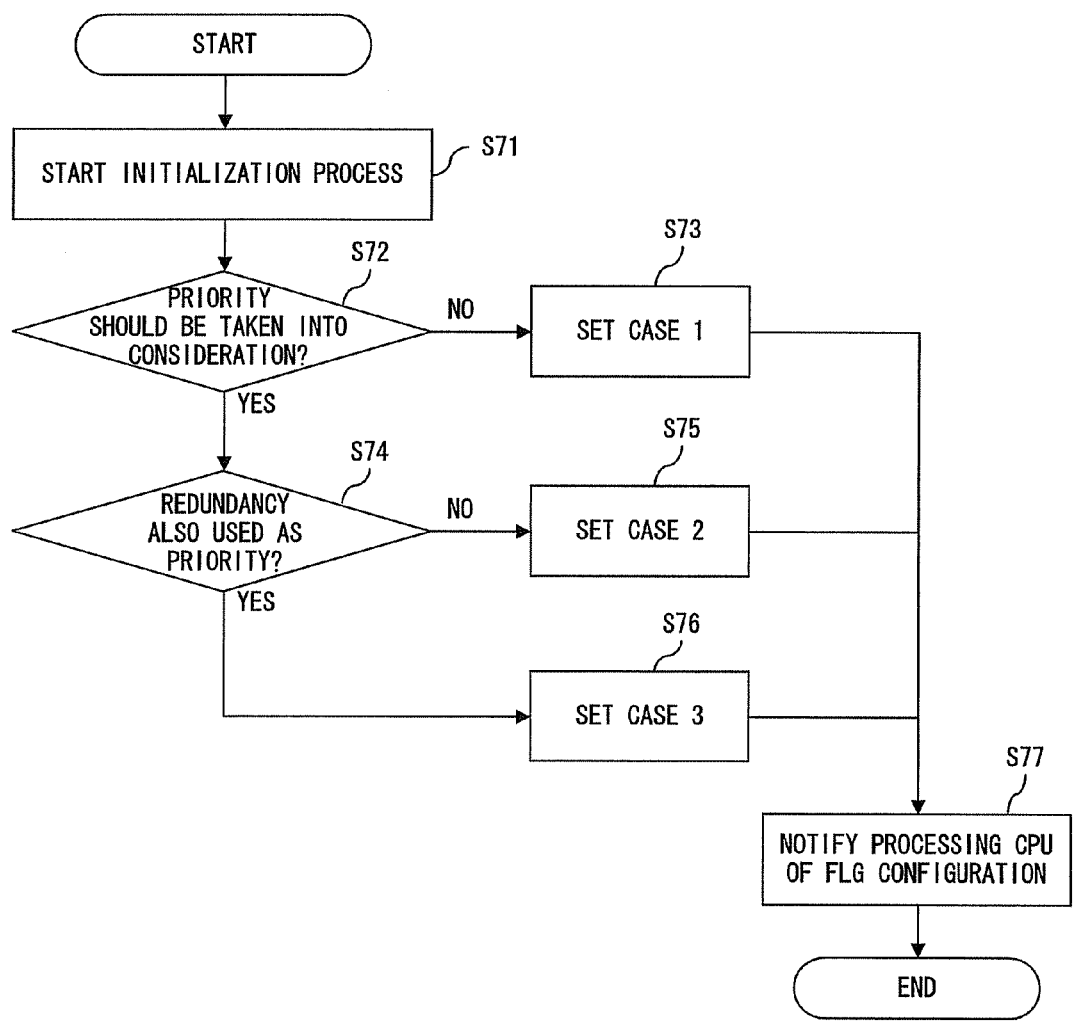
FIG. 9 is a flowchart showing the process of selecting the flag configuration.

FIG. 9 is a flowchart showing the process of selecting the flag configuration. Firstly, in step S71 the transaction CPU 11 recognizes the start of the initialization process of the device, in step S72 a value indicating whether a transaction should be executed by taking priority into consideration is referenced in memory, which is not shown in FIG. 2. If a value indicating that no priority should be taken into consideration is stored, the flow proceeds to step S73. In step S73, the "case 1" is set as a flag configuration to be used and the flow proceeds to step S77.

If in step S72 it is determined that a value indicating that priority should be taken into consideration is stored, the flow proceeds to step S74 to further determine whether the redundancy of the flag should be used as the priority of the transaction, specifically redundancy should be set according to the priority of the transaction. If redundancy and priority ,are set separately, the flow proceeds to step S75. In step S75, the "case 2" is set as the flag configuration to be used and the flow proceeds to step S77. If redundancy is set according to priority, the flow proceeds to step S76. In step S76, the "case 3" is set as the flag configuration and the flow proceeds to step S77. In step S77, each processing CPU 12 is notified of the flag configuration and the process is terminated.

In addition to a value referenced to determine the flag configuration in steps S72 or S74, a variety of values (setting data) are set in advance by a program or the station data of the device in order to execute a transaction with a redundant configuration, to execute a transaction with high priority with priority and further to appropriately maintain the load status of the processing CPU 12.

FIG. 10 shows an example of setting data to be referenced in the processing circuit of this preferred embodiment. The transaction CPU 11 performs each of the above-described settings, determinations and the like referring to setting data stored in the memory, which is not shown in FIG. 2. The setting data includes the initial value of the read interval of the read pointer register 16 and redundancy to be set in addition to priority consideration/non-consideration information for determining whether priority should be taken into consideration and combined use availability/non-availability information for determining whether redundancy and priority can be combined and used. The setting data further includes data for setting the read interval of the read pointer register 16 according to a load status, data for modifying redundancy according to the load status of the processing CPU 12, data for discarding a transaction when determining that the load of the processing CPU 12 is heavy, data for maintaining the load of a specific processing CPU at a low level and the like.

The processing circuit 1 of this preferred embodiment controls the execution of a transaction using the data shown in FIG. 10, based on the load ratio of the processing CPU 12, the depth of an FIFO (FIFO length), the amount of redundancy change per unit time and the like. A control method other than that described above is described below with reference to the drawings.

Figure 11:
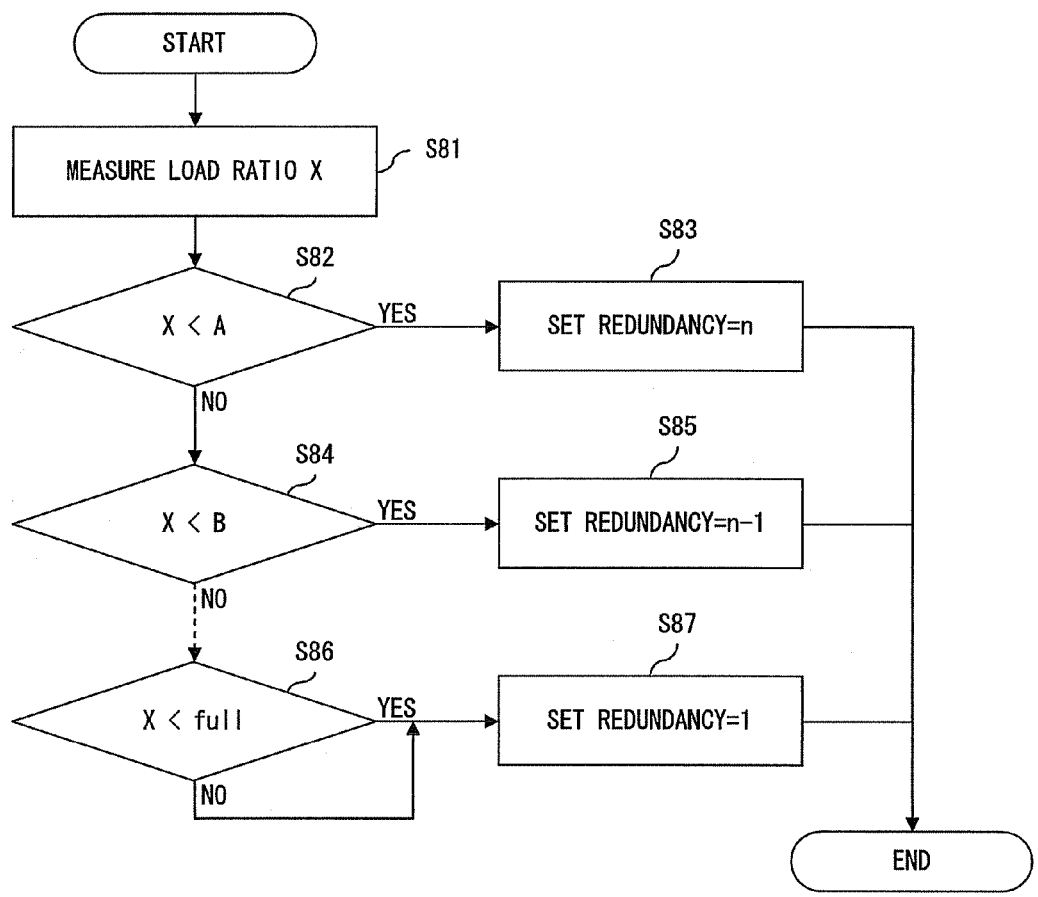
FIG. 11 is a flowchart showing the process of setting redundancy according to the load ratio of the processing CPU.

FIG. 11 is a flowchart showing the process of setting redundancy according to the load ratio of the processing CPU 12. The process shown in FIG. 11 is executed, for example, at the timing of the transaction CPU 11 receiving a transaction inputted from an I/O unit.

Firstly, in step S81, the load ratio X of the processing CPU 12 is measured. In this case, as already described, the load ratio X is, for example, either one of the measurement value of the usage ratio of the processing CPU 12, the depth of a FIFO or the like. Then, in step S82, it is determined whether the load ratio X is less than a predetermined threshold A. In step S82 it is determined whether the load ratio X is sufficiently small that the setting of the redundancy to the maximum is expected to have little influence on transaction speed. If the load ratio X is less than the threshold A, the flow proceeds to step S83. In step S83, the maximum value n (n=positive integer) is set and the process is terminated.

If in step S82 it is judged that the load ratio X is equal to or more than the threshold A, the flow proceeds to step S84 to further determine whether the load ratio X is less than a threshold B. The threshold B is set to a value less than the threshold A. If the load ratio X is less than the threshold B, the flow proceeds to step S85. In step S85, the redundancy is set to (n−1) and the process is terminated. When the load ratio X is greater than or equal to threshold B, the threshold used in the previous determination (in this case, the threshold C which is smaller than the threshold B) is sequentially compared with the load ratio X, and when setting the redundancy, as the load ratio X increases, a smaller value is set for the redundancy. In step S86, the load ratio X is compared with the maximum value of the threshold (shown as "full" in FIG. 11). However, in this case, regardless of whether the load ratio X is larger than the maximum value of the threshold in step S87, "1" being the minimum value is set as the redundancy and the process is terminated.

The process shown in FIG. 11 can also be regularly executed at the timing the transaction CPU 11 receives a transaction from an I/O unit. By regularly executing the series of processes shown in FIG. 11, redundancy can also be gradually increased or reduced according to the load status of the processing CPU 12. For example, if (redundancy)=3 is set when receiving a transaction from an I/O unit, by each processing CPU 12 executing another transaction subsequently, the load ratio X increases. Even in such a case, redundancy can be sequentially reduced as the load ratio X increases, such as to 2, and to 1. Conversely, even when (redundancy)=1 is set when receiving a transaction, redundancy can be sequentially increased as the load ratio X decreases subsequently, such as to 2, and to 3. In other words, by changing redundancy according to the load status of a processing CPU 12 executing a transaction, the reliability of transaction execution can be maximally optimized and also processing performance can be prevented from degrading due to the increase of a load.

Although FIG. 11 shows the process of setting redundancy according to the value of the load ratio X, the present invention is not limited to this configuration. For example, the read interval of the read pointer register 16 can also be set instead of the redundancy. By setting a smaller read interval the smaller the load ratio X is, and a larger read interval the larger the load ratio is the same effect can be obtained.

Figure 12:
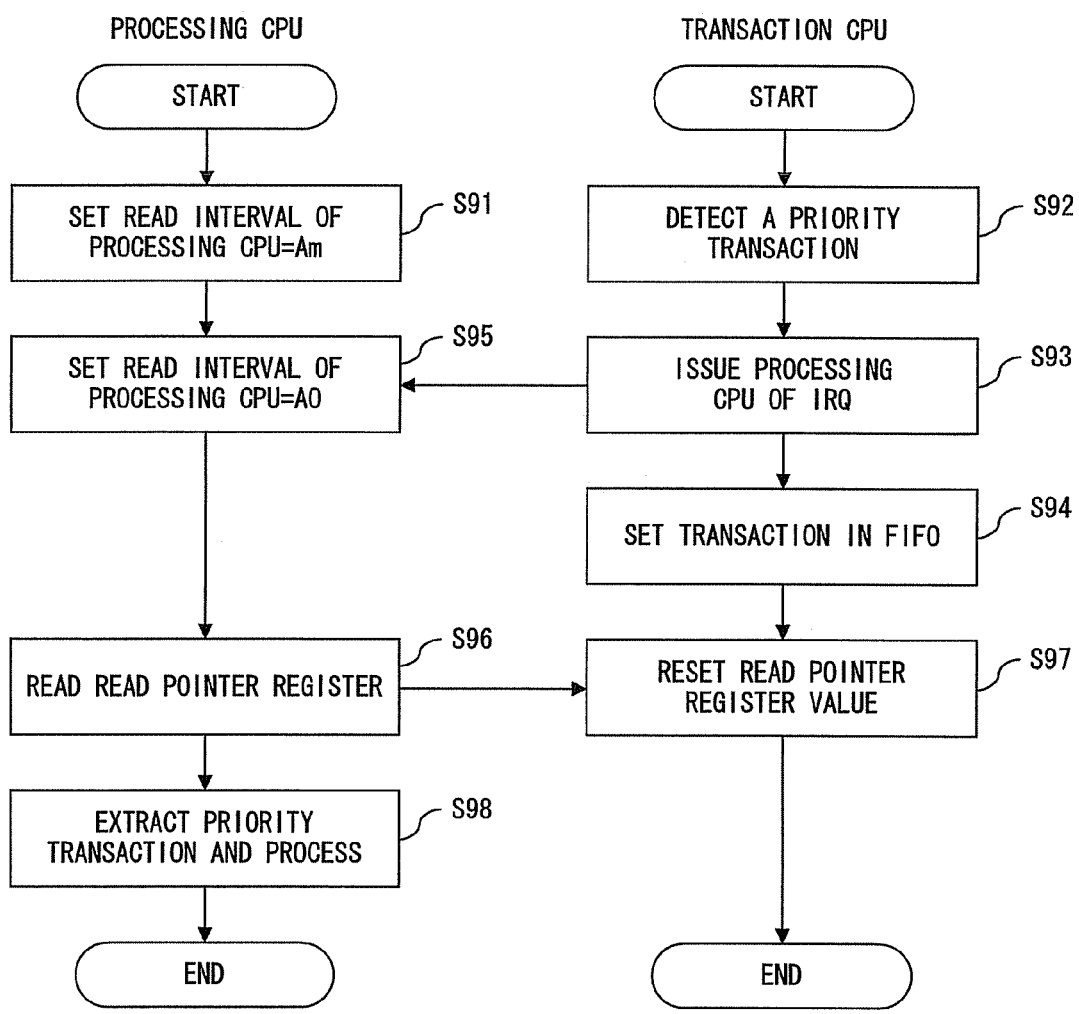
FIG. 12 is a flowchart showing the process in the case where a transaction with priority is inputted.

FIG. 12 is a flowchart showing the process in the case of a transaction with priority being inputted. Instep S91, with regard to one of a plurality of processing CPUs 12 constituting the processing circuit 1 (processing CPU 12N in this case), its read interval is set to be longer than the other processing CPUs, for example, to the longest possible value, in advance. By setting the read interval longer, the load of the processing CPU 12N can be maintained lower than those of the other processing CPUs 12. In step S92, when it is detected that a transaction with high priority is inputted from an I/O unit, in step S93 an interrupt request is transmitted to the processing CPU 12N and in step S94 the detected transaction with high priority is set in the pointer set FIFO 15.

In the processing CPU 12N that is notified of the interrupt request by the transaction CPU 11, its read interval is reset to the shortest possible value, and in step S96 the value of the read pointer register 16 is read. Upon receipt the notice that the processing CPU 12N has read the read pointer register 16 from the processing CPU 12N, in step S97 the transaction CPU 11 resets the value of the read pointer register 16 and the process is terminated. Instep S98, the processing CPU 12N reads a priority transaction from the input memory 13 and executes it, and the process is terminated. In step S98, a priority transaction is placed in the front of the queue and the other transactions are sequentially disposed at the end of the queue. By executing the process shown in FIG. 12, the reliability of priority transaction execution is improved.

Although FIG. 12 shows the process in the case where a priority transaction is detected in step S91, the present invention is not limited to this. For example, when the transaction CPU 11 recognizes that the load of the processing CPU 12 varies rapidly, the read interval of a specific processing CPU 12 of the plurality of processing CPUs can also be reset. In such a case, for example, when the load of the processing CPU 12 increases rapidly, the load can be reduced by resetting the read interval of the specific processing CPU 12 to its longest possible value to reduce the load.

Figure 13:
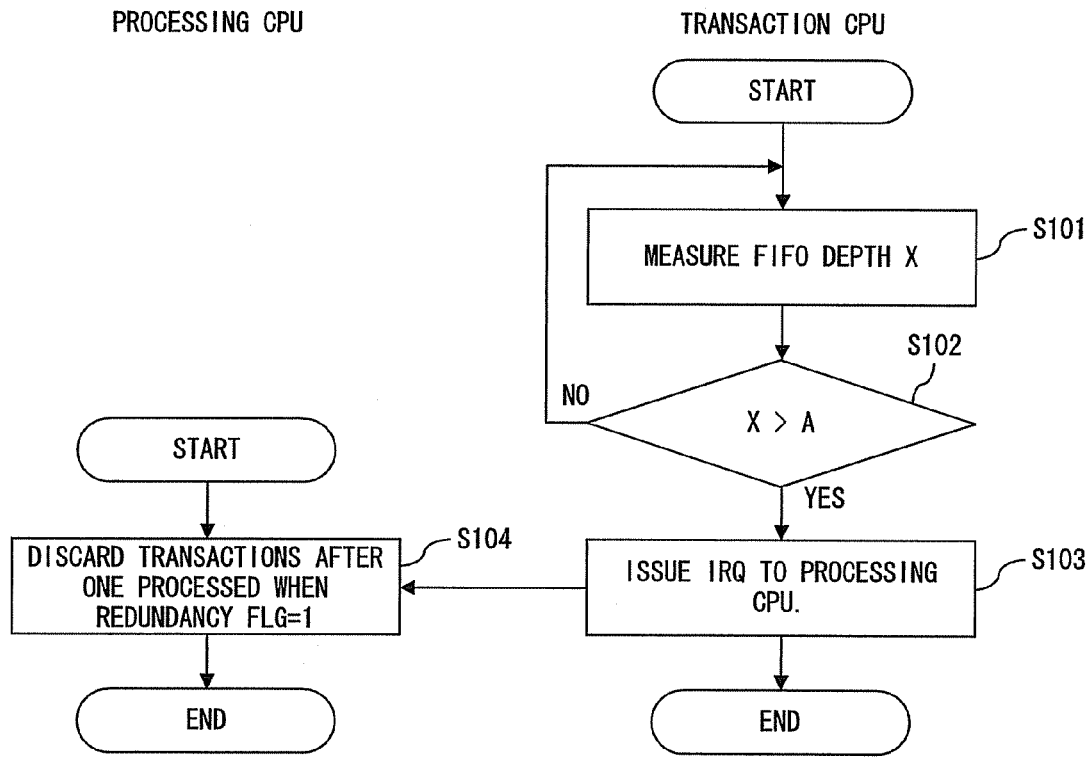
FIG. 13 is a flowchart showing an example of the process of reducing the load of the processing CPU.

FIG. 13 is a flowchart showing an example of the process of reducing the load of the processing CPU 12. The process of reducing the load of the processing CPU 12 is achieved by monitoring the depth of a FIFO, being one index for determining the load status of the processing CPU 12. The "depth of a FIFO" means the number of pointers accumulated on the FIFO.

Firstly, in step S101, the depth X of the pointer set FIFO 15 is measured. In step S102, it is determined whether the measurement value X exceeds the threshold value A and the depth X of a FIFO is regularly measured until it is determined that the measurement value X is larger than the threshold A. The threshold A is defined in advance by a program or station data like the threshold, such as the CPU usage ratio.

If the depth X of a FIFO exceeds the threshold A, the flow proceeds to step S103 to issue an interrupt request to the processing CPU 12. Upon receipt of the interrupt request, the processing CPU 12 discards transactions other than one read when the value of a flag for indicating redundancy is "1", and the flow is terminated.

If the depth X of a FIFO exceeds the threshold A, it is predicted that the load of the processing CPU will increase since an unprocessed transaction is stored. In that case, only one of the plurality of processing CPUs executes the transaction and transactions read by the other processing CPUs 12 are discarded. Thus, if a transaction to be processed is unprocessed and stored, the number of processing CPUs 12 executing each transaction can be restricted (can be restricted to one in FIG. 13) to prevent the load from increasing. An arbitrary value can be set in the processing CPU that continues to execute a transaction without discarding it.

Figure 14:
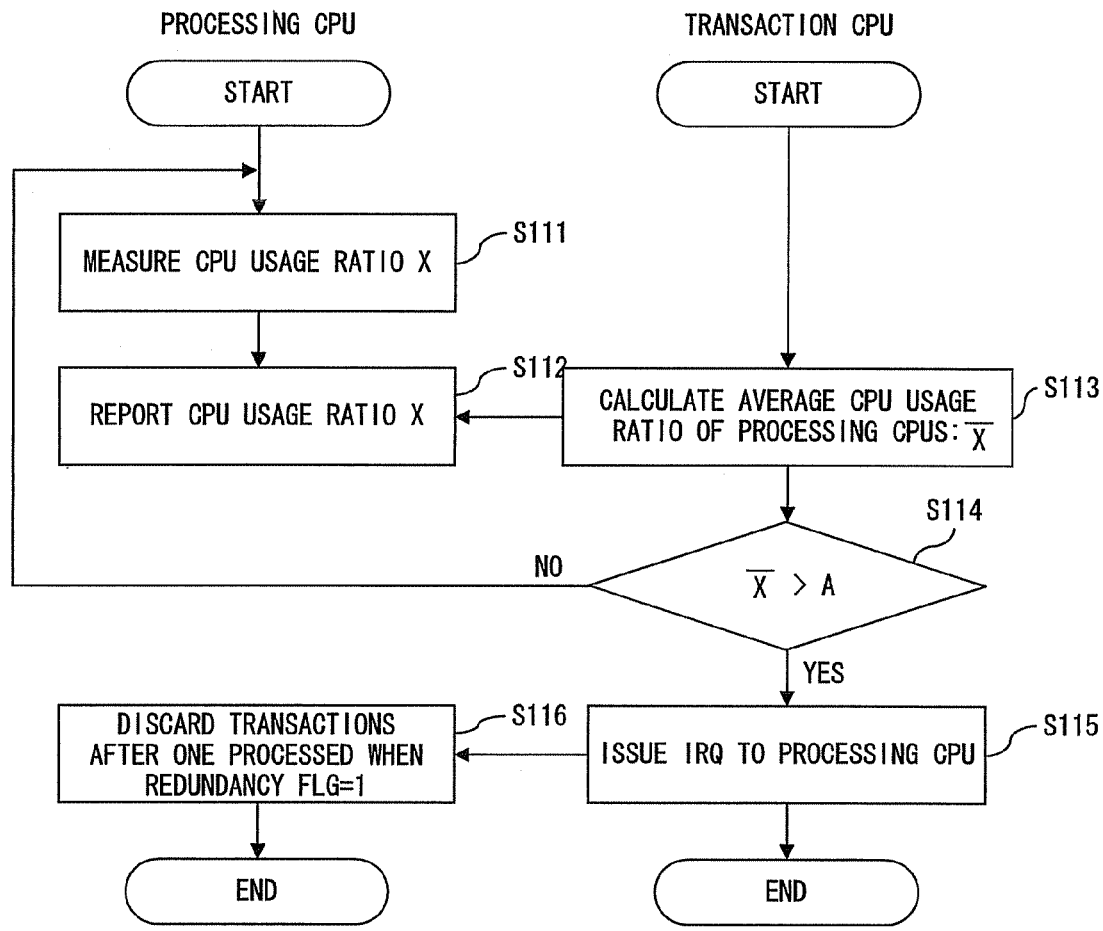
FIG. 14 is a flowchart showing another example of the process of reducing the load of the processing CPU.

FIG. 14 is a flowchart showing another example of the process of reducing the load of the processing CPU 12. The process of monitoring a CPU usage ratio being one of other indexes for determining the load status of the processing CPU 12 and reducing the load by restricting the number of processing CPUs for executing a transaction as in FIG. 13 is described with reference to FIG. 14.

Firstly, in step S111 the processing CPU 12 measures the usage ratio X of the device, and in step S112 the CPU usage ratio X obtained as a result of the measurement is reported to the transaction CPU 11. In step S113, upon receipt of the report, the transaction CPU 11 determines whether its average CPU usage ratio exceeds the threshold value A. The threshold A is defined in advance by a program or station data as already described with reference to FIG. 13. If in step S114 it is determined that the average CPU usage ratio is less than the threshold A, the flow returns to step S111. Subsequently, until the average CPU usage ratio exceeds the threshold A, the processes in steps S111 through S114 are repeated.

When the average CPU usage ratio exceeds the threshold A, the flow proceeds to step S115. Since processes in steps S115 and S116 shown in FIG. 14 are the same as those in steps S103 and S104 shown in FIG. 13, their descriptions are omitted here.

By executing the process shown in FIG. 14, the same effect as obtained by executing the process shown in FIG. 13 by restricting the number of the processing CPUs for executing each transaction even when the CPU usage ratio is increased by executing a transaction or the like and the load of the processing CPU 12 increases can be obtained.

Figure 15:
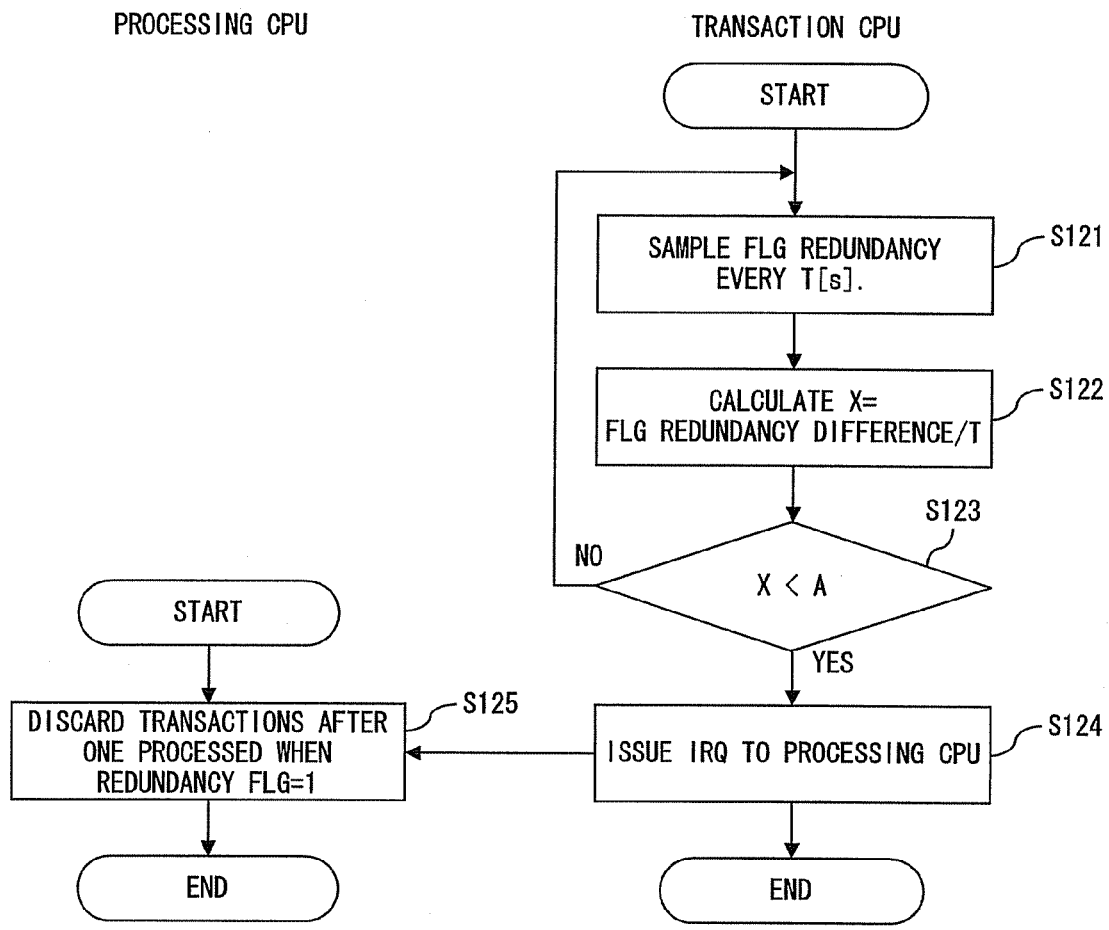
FIG. 15 is a flowchart showing another example of the process of reducing the load of the processing CPU.

FIG. 15 is also a flowchart showing another example of the process of reducing the load of the processing CPU 12. In the process shown in FIG. 15, it is the amount of change of a flag per unit time, that is, redundancy that is used as one of other indexes for determining the load status of the processing CPU.

Firstly, in step S121, values indicating the redundancy of the flag are collected at a predetermined time interval, T[s] in this case. Then, in step S122, the change amount X of redundancy per unit time is calculated. For example, if the redundancy at time T1 and the redundancy at time T2(=T1+ T), T[s] after the time T1, are FLG(T1) and FLG(T2), respectively, the change amount X can be calculated as follows.

$$X=(FLG(T1)-FLG(T2))/T$$

In step S123 it is determined whether the calculated change amount X is less than a predetermined threshold A, and the processes in steps S121 through S123 are repeated until the change amount X per unit time of redundancy becomes less than the threshold A. In this case, the threshold A is the threshold of the amount of change per unit time of redundancy. This threshold is defined in advance by a program or station data in the same way as other thresholds.

When in step S123 the change amount X becomes less than the threshold A, the flow proceeds to step S124. Since processes in steps S124 and S125 are the same as those in the steps S103 and S104 shown in FIG. 13, their descriptions are omitted here.

When the amount of change of redundancy per unit time of a specific transaction decreases, in other words a frequency of a plurality of processing CPUs 12 for executing the transaction actually reads information of a flag and the like from a register and starts processing decreases, it is determined that the load of the processing CPU 12 has increased. In this case, by restricting the number of the processing CPUs 12 for executing the transaction in order to reduce the load of the processing CPU 12, the same effect as executing the process shown in FIG. 13 or 14 can be obtained.

So far the processing method for reducing a load applied to the processing CPU 12 when the load of the processing CPU 12 increases in the processing circuit 1 has been described with reference to FIGS. 13 through 15. The processing circuit 1 of this preferred embodiment can also execute a transaction according to the amount of transactions externally inputted.

Figure 16:
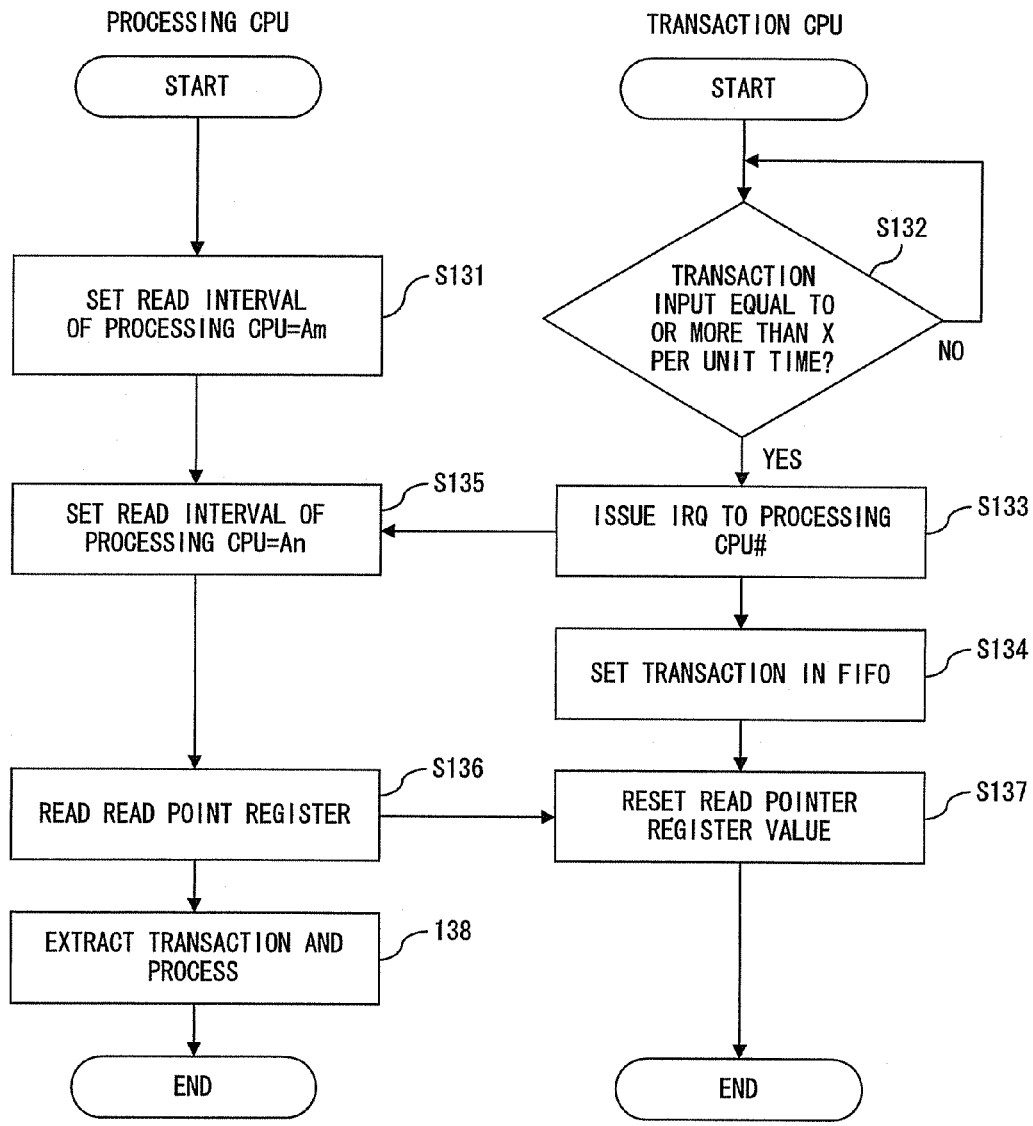
FIG. 16 is a flowchart showing the process of monitoring the amount of transactions inputted to the processing circuit and executing the transaction.

FIG. 16 is a flowchart showing the process of monitoring the amount of a transaction inputted to the processing circuit 1 and executing the transaction. Firstly, in step S131, a value which is the longest in the settable range is set for one or more specific processing CPUs as a read interval at which the read pointer register 16 is read. In step S132, the transaction CPU 11 monitors whether the amount X per unit time of transactions inputted to the processing circuit 1 via an I/O unit is equal to or more than a predetermined threshold A. If in step S132 it is determined that the input amount X per unit time of transactions is greater than or equal to the threshold A, the flow proceeds to step S133. Since processes executed by the transaction CPU 11 and the processing CPU in steps S133 and subsequently are the same as those in steps S93 and subsequently as shown in FIG. 12, their descriptions are omitted here.

When the amount of transactions inputted to the processing circuit 1 increases rapidly, the read interval of the read pointer register 16 of the processing CPU 12 in which the longest value is set as the read interval at which the read pointer register 16 is read is set to a short value in advance (the shortest in FIG. 16) of the load of the processing CPU 12 for executing a transaction. By setting a frequency that the processing CPU 12 reads data to a high level, the efficiency with which a large amount of transactions are processed can be improved.

Although in FIG. 16, the transaction execution does not vary depending on transaction priority and the same transaction is executed, the present invention is not limited as such. For example, when a priority transaction is inputted, in step S138 the priority transaction can also be disposed at the front of the queue and is processed earlier than the other transactions.

As described above, according to the processing circuit 1 of this preferred embodiment, the redundancy and priority of a transaction of the processing CPU is determined according to the load status of a system, such as a device comprising the processing circuit 1 or the like. Thus, even when a specific processing CPU fails, a transaction can be relieved. In the execution of a transaction, communication is not conducted via a common bus. A transaction is inputted/outputted using input/output memory provided for each processing CPU. Therefore, the conventional bottle-neck of the common bus does not occur. Thus, by using the processing circuit of this preferred embodiment, a highly stable system can be built.

What is claimed is:

1. A processing device, comprising:
    a transaction input/output CPU for receiving a transaction to be executed and outputting an execution result of the transaction;
    a plurality of processing CPUs for executing the transaction according to an instruction from the transaction input/output CPU;
    a plurality of transaction storage units provided corresponding to each processing CPU, for storing the transaction inputted to the transaction input/output CPU and an execution result of the transaction; and
    a destination storage unit for storing storage destination information indicating a storage destination common to the plurality of storage units,
    wherein
    the plurality of processing CPU reads the storage destination information from the destination storage unit and reads the transaction from the storage destination of the transaction stored in the transaction storage unit corresponding to each processing CPU and executes the transaction in parallel.

2. The processing device according to claim 1, wherein the plurality of processing CPUs reads storage destination information stored in the destination storage unit at preset time intervals.

3. The processing device according to claim 2, wherein the time interval is set for each processing CPU.

4. The processing device according to claim 1, wherein the destination storage unit further stores weighting information about redundancy for executing an inputted transaction by a plurality of processing CPUs in parallel and a priority of the transaction, and
the transaction input/output CPU sets the weighting information, based on a status of a load applied to the processing circuit or a priority included in the inputted transaction and stores the weighting information in the destination storage unit.

5. The processing device according to claim 4, wherein the processing CPU subtracts a predetermined value from the redundancy in the destination storage unit each time a processing CPU executes the transaction, and
the plurality of processing CPUs read the transaction until the redundancy in the destination storage unit becomes an invalid value.

6. The processing device according to claim 4, wherein the processing CPU sets the redundancy independently of a priority included in an inputted transaction.

7. The processing device according to claim 4, wherein when the priority included in an inputted transaction is high, the processing CPU sets a high redundancy dependent on the priority.

8. The processing device according to claim 4, wherein the plurality of processing CPUs reads the storage destination information and the weighting information at time intervals preset for each processing CPU, and
when the priority included in an inputted transaction is high, a processing CPU capable of reading information at shorter time intervals executes the transaction with priority.

9. The processing device according to claim 1, wherein the plurality of processing CPUs determines whether a load of the processing CPU exceeds a predetermined value, based on a usage ratio of the processing CPU.

10. The processing device according to claim 1, wherein the transaction input/output CPU determines whether a load of the plurality of processing CPUs exceeds a predetermined value, based on the number of transactions stored in the transaction storage unit.

11. The processing device according to claim 1, wherein the transaction input/output CPU determines whether a load of the processing CPU exceeds a predetermined value, based on the number of read transactions per unit time for the plurality of processing CPUs reading storage destination information.

12. The processing device according to claim 9, wherein when it is determined that a load of the plurality of processing CPUs exceeds the predetermined value, the transaction input/output CPU discards the transaction that two or more processing CPUs redundantly execute, of one or more processing CPUs.

13. The processing device according to claim 9, wherein when it is determined that a load of the plurality of processing CPUs exceeds the predetermined value, the transaction input/output CPU resets the redundancy to a smaller value.

14. The processing device according to claim 9, wherein when it is determined that a load of the plurality of processing CPUs exceeds the predetermined value, the transaction input/output CPU gradually increases or reduces the redundancy of a transaction redundantly executed by a plurality of processing CPUs, according to a load of the processing CPU.

* * * * *